(12) United States Patent
Kathirvel et al.

(10) Patent No.: US 10,065,750 B2
(45) Date of Patent: Sep. 4, 2018

(54) AIRCRAFT MAINTENANCE SYSTEMS AND METHODS USING WEARABLE DEVICE

(71) Applicant: HONEYWELL INTERNATIONAL INC., Morristown, NJ (US)

(72) Inventors: Kannan Kathirvel, Sivagiri Sivagiri (IN); Pradeep Mahalingaiah, Karuataka (IN); Michael Christensen, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 561 days.

(21) Appl. No.: 14/618,181

(22) Filed: Feb. 10, 2015

(65) Prior Publication Data
US 2016/0229562 A1   Aug. 11, 2016

(51) Int. Cl.
| | |
|---|---|
| *B64F 5/00* | (2017.01) |
| *G02B 27/01* | (2006.01) |
| *G06F 3/16* | (2006.01) |
| *H04L 29/08* | (2006.01) |
| *H04R 1/02* | (2006.01) |
| *B64F 5/60* | (2017.01) |

(52) U.S. Cl.
CPC .............. *B64F 5/0045* (2013.01); *B64F 5/60* (2017.01); *G02B 27/017* (2013.01); *H04L 67/141* (2013.01); *H04R 1/028* (2013.01); *H04R 2460/13* (2013.01)

(58) Field of Classification Search
CPC . B64F 5/0045; B64F 5/40; B64F 5/60; G02B 27/017; G06F 3/005; G06F 3/167; G06Q 10/06; G06Q 10/087; G06Q 10/20; H04B 1/385; H04B 2001/3866; H04L 67/141; H04N 5/2252; H04N 7/185; H04N 2005/2255; H04R 1/028; H04R 2201/107; H04R 2460/13
See application file for complete search history.

(56) References Cited

U.S. PATENT DOCUMENTS

| | | | |
|---|---|---|---|
| 6,356,437 B1 * | 3/2002 | Mitchell | ................. G06F 1/163 342/352 |
| 6,697,894 B1 * | 2/2004 | Mitchell | ................. G06F 1/163 361/679.4 |
| 8,788,138 B1 | 7/2014 | Yogesha et al. | |
| (Continued) | | | |

OTHER PUBLICATIONS

Wartsila Remote Support; Retrieved from Internet on Jan. 13, 2016 [https://youtu.be/wJdvg1o9gQg].
(Continued)

*Primary Examiner* — Thomas G Black
*Assistant Examiner* — Ce Li Li
(74) *Attorney, Agent, or Firm* — Lorenz & Kopf, LLP

(57) ABSTRACT

Methods and systems are provided for managing maintenance activities of an aircraft using a wearable device. In one embodiment, a method comprises: receiving, at the wearable device, part data from at least one of a video recording device and an audio recording device of the wearable device; communicating by the wearable device with at least one of an onboard avionics system, an airline operations system, and an inventory management system based on the part data; and presenting maintenance information to a user via at least one of a display system, and an audio system of the wearable device based on the communicating.

21 Claims, 3 Drawing Sheets

(56) References Cited

U.S. PATENT DOCUMENTS

| | | | | |
|---|---|---|---|---|
| 9,113,050 B2* | 8/2015 | Laughlin | | H04N 7/185 |
| 9,446,856 B1* | 9/2016 | Roling | | B64D 47/00 |
| 9,727,992 B2* | 8/2017 | Jo | | G06T 11/001 |
| 2002/0046214 A1* | 4/2002 | Sandifer | | G06F 17/30011 |
| 2003/0055715 A1* | 3/2003 | Spence | | B64F 5/00 |
| | | | | 705/7.24 |
| 2005/0055239 A1* | 3/2005 | Farmer | | G06Q 10/06 |
| | | | | 705/7.11 |
| 2005/0187739 A1* | 8/2005 | Baust | | G06Q 10/06311 |
| | | | | 702/184 |
| 2007/0112576 A1* | 5/2007 | Avery | | G06Q 10/06393 |
| | | | | 705/7.39 |
| 2007/0112608 A1* | 5/2007 | Avery | | G06Q 10/06 |
| | | | | 705/305 |
| 2007/0241908 A1* | 10/2007 | Coop | | G06Q 10/06 |
| | | | | 340/572.8 |
| 2008/0159158 A1* | 7/2008 | Poisson | | G06Q 10/06 |
| | | | | 370/249 |
| 2009/0248459 A1* | 10/2009 | Avery | | G06Q 10/06 |
| | | | | 701/14 |
| 2012/0120070 A1* | 5/2012 | Baillot | | G08B 13/19621 |
| | | | | 345/419 |
| 2012/0183137 A1* | 7/2012 | Laughlin | | H04N 7/185 |
| | | | | 380/200 |
| 2012/0306666 A1* | 12/2012 | Xu | | G06Q 10/06 |
| | | | | 340/945 |
| 2013/0114100 A1 | 5/2013 | Torii et al. | | |
| 2013/0115923 A1 | 5/2013 | Earl et al. | | |
| 2013/0215281 A1* | 8/2013 | Hobby | | G06F 3/005 |
| | | | | 348/207.1 |
| 2014/0022281 A1 | 1/2014 | Georgeson et al. | | |
| 2014/0247283 A1* | 9/2014 | Jo | | G06T 11/001 |
| | | | | 345/633 |
| 2015/0100201 A1* | 4/2015 | Alexandre | | B64F 5/0045 |
| | | | | 701/33.2 |
| 2015/0100892 A1* | 4/2015 | Cronin | | G06Q 10/0633 |
| | | | | 715/747 |

OTHER PUBLICATIONS

DAZRI Smart Helmet: Origins; Retrieved from Internet on Jan. 13, 2016 [Dacqri: https://youtu.be/qIU456jtkmw].

Terensi, et al.; "An Augmented Reality Platform for Training and Field Operations in the Manufacturing Industry" Inglobe Technologies Srl, 2014.

Taylor, Dr. M, GE Aviation Systems; "Technologies & Techniques for New Maintenance Concepts" GE Aviation Systems, 2010.

\* cited by examiner

AIRCRAFT MAINTENANCE SYSTEMS AND METHODS USING WEARABLE DEVICE

TECHNICAL FIELD

The present disclosure generally relates to methods and systems for managing maintenance operations of an aircraft, and more particularly relates to methods and systems for managing maintenance operations of an aircraft using a wearable display device.

BACKGROUND

Information indicating a need for aircraft maintenance is collected from multiple sources such as flight logs, fault history, and pilot memos, and is stored in a centralized location inside the aircraft or outside of the aircraft. Accumulating maintenance information in a centralized location enables mechanics to perform different types of aircraft maintenance activities (line maintenance, overnight maintenance, and extended maintenance) in one place. Reducing the time to perform maintenance activities is important in achieving the financial benefits of airplane operational availability.

Maintenance personnel access the information through a maintenance access terminal that is connected to the centralized location containing the maintenance information. Along with the availability of information, an efficient maintenance access terminal helps the maintenance personnel to achieve the operational benefits of reduced airplane maintenance downtime. Conventional maintenance access terminals are implemented on laptops or other computers that occupy the maintenance personnel's hands and attention for operation. Typically, maintenance access terminals are wired with aircraft systems and/or accessed within the cockpit displays which limit the portability during maintenance. These conventional maintenance access terminals delay completion of the maintenance activity.

Hence, there is a need for improved systems and methods for managing maintenance operations of an aircraft. Other desirable features and characteristics will become apparent from the subsequent detailed description and the appended claims, taken in conjunction with the accompanying drawings and the foregoing technical field and background.

BRIEF SUMMARY

Methods and systems are provided for managing maintenance activities of an aircraft using a wearable device. In one embodiment, a method comprises: receiving, at the wearable device, part data from at least one of a video recording device and an audio recording device of the wearable device; communicating by the wearable device with at least one of an onboard avionics system, an airline operations system, and an inventory management system based on the part data; and presenting maintenance information to a user via at least one of a display system, and an audio system of the wearable device based on the communicating.

In another embodiment, a system includes a wearable device including a display device, an audio system, and at least one of an audio recording device and a video recording device. The wearable device is configured to receive, part data from at least one of the video recording device and the audio recording device, communicate with at least one of an onboard avionics system, an airline operations system, and an inventory management system based on the part data, and present maintenance information to a user via at least one of the display system, and the audio system based on the communicating.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number of hardware, software, and/or firmware components configured to perform the specified functions. For example, exemplary embodiments may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that exemplary embodiments may be practiced in conjunction with any number of control systems, and that the vehicle systems described herein are merely exemplary embodiments.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Figure 1:
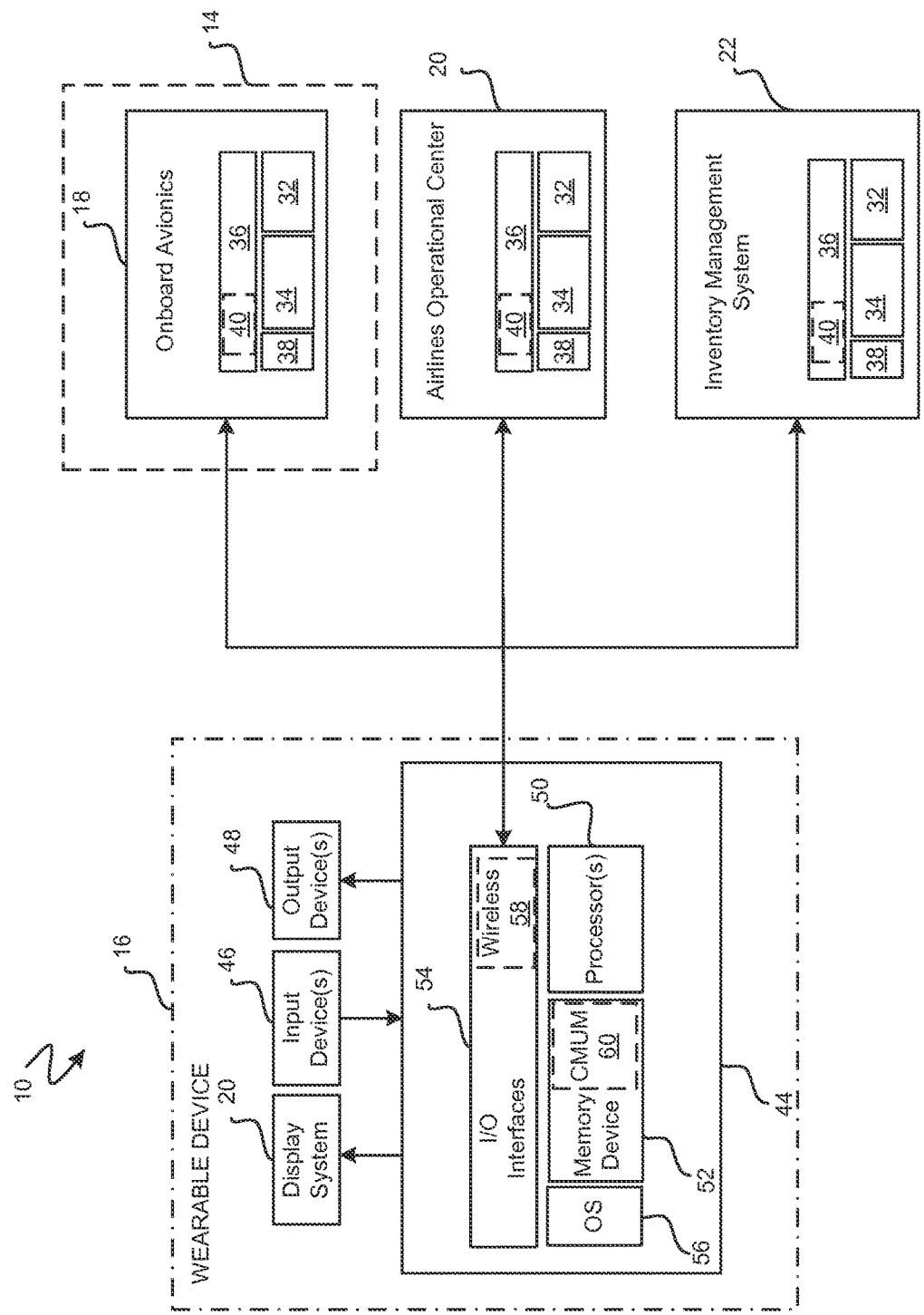
FIG. 1 is a functional block diagram illustrating a maintenance management system in accordance with exemplary embodiments.

Referring now to FIG. 1, exemplary embodiments of the present disclosure are directed to a maintenance management system, shown generally at 10, for managing maintenance operations of an aircraft 14. Although the figures shown herein depict an example with certain arrangements of elements, additional intervening elements, devices, features, or components may be present in actual embodiments. It should also be understood that FIG. 1 is merely illustrative and may not be drawn to scale.

The maintenance management system 10 generally includes a wearable device 16 that communicates (e.g., wirelessly, in a wired manner, or a combination of wirelessly and in a wired manner) with one or more computing systems 18, 20, 22 associated with the aircraft 14. The wearable device 16 may be any device that is wearable by a user and that includes an integrated display system 24. In the exemplary embodiments discussed herein, the wearable device 16 includes eyeglasses that are wearable by a user and that include the integrated display system 24. The integrated display system 24 includes a display that is positionable such that information pertaining to a maintenance activity is displayed to the user in the user's field of view, regardless of where the user is looking.

The wearable device 16 communicates with the computing systems 18-22 to obtain information used for maintenance activities. In various embodiments, the computing system 18 is an onboard system that stores information about the aircraft 14 including, but not limited to, flight logs, fault history, pilot memos, and any other operational information. In various embodiments, the computing system 20 is an airline operations system that stores departure and arrival information at least about the aircraft 14 and in various embodiments, other aircraft. In various embodiments, the computing system 22 is an inventory management system that stores information about aircraft parts and tools used in maintenance activities. The inventory management system can be part included in the aircraft 14 and/or included in an equipment manufacturer system. As can be appreciated, the computing systems 18-22 can be implemented as separate systems (as shown), as a single system, or as a combination of systems.

Each of the computing systems 18-22 generally include processing hardware, such as a processor 32, a memory device 34, input/output interfaces 36 and the like, that are managed and accessed by a suitable operating system 38. The processor 32 may include one or more of microprocessors, microcontrollers, processing cores and/or other computing resources spread across any number of distributed or integrated systems. The memory device 34 may include any non-transitory short or long term storage capable of storing programming instructions for execution on the processor 32, such as, but not limited to, random access memory (RAM), read only memory (ROM), flash memory, magnetic or optical mass storage, and/or the like.

The input/output interfaces 36 may include software and/or hardware for communicating with networks (e.g., local area networks, wide area networks, or other networks), for communicating with peripheral devices (not shown) associated with the computing system 18 (e.g., mouse, keyboard, touchscreen, display, etc.), and for communicating with the wearable device 16. In particular, the input/output interfaces 36 include a wireless interface 40 for wirelessly communicating data to and wirelessly receiving data from the wearable device 16 according to a wireless communication protocol. In various embodiments, the wireless interface 40 communicates directly with the wearable device 16 according to the wireless communication protocol. In various other embodiments, the wireless interface 40 communicates with a wireless access point (not shown) that is associated with the computing system 18 and the wireless access point communicates with the wearable device 16 according to the wireless communication protocol. In such embodiments, the wireless interface 40 communicates with the wireless access point according to a wired or a wireless protocol.

The wearable device 16 includes a computing system 44, one or more input devices 46, one or more output devices 48, and the display system 24. The input devices 46 can include, but are not limited to a touch pad, one or more depressible buttons, one or more switches, an audio recording device, a video recording device and/or any other type of device capable of accepting and interpreting user input. The output devices 48 can include, but are not limited to, an audio device (e.g., a convention audio device, a bone conduction device, or other audio device), a haptic device, and/or any other type of device for communicating information and/or notifications to a user. The display system 24 includes a display and a projection device that displays content on the display device based on information received from the computing system 44. In the case of the wearable device 16 being eyeglasses, the display is a lens or display piece in front of a lens of the eyeglasses.

The computing system 44 of the wearable device 16 generally includes processing hardware, such as a processor 50, a memory device 52, input/output interfaces 54 and the like, that are managed and accessed by a suitable operating system 56. The processor 50 may include one or more of microprocessors, microcontrollers, processing cores and/or other computing resources spread across any number of distributed or integrated systems. The memory device 52 may include any non-transitory short or long term storage capable of storing programming instructions for execution on the processor 50, such as, but not limited to, random access memory (RAM), read only memory (ROM), flash memory, magnetic or optical mass storage, and/or the like.

The input/output interfaces 54 may include software and/or hardware for communicating with the display system 24, for communicating with the input devices 46, for communicating with the output devices 48, and for communicating with the computing systems 18-22. In particular, the input/output interfaces 54 include a wireless interface 58 for wirelessly communicating data to and wirelessly receiving data from the computing systems 18-22 according to a wireless communication protocol. In various embodiments, the wireless interface 58 communicates directly with the computing systems 18-22 according to the wireless communication protocol. In various other embodiments, the wireless interface 58 communicates with a wireless access point (not shown) that is associated with the computing systems 18-22 and the wireless access point communicates with the computing systems 18-22. In such embodiments, the wireless access point communicates with the computing systems 18-22 according to a wired or a wireless protocol.

In various embodiments, the memory device 52 includes a maintenance module (MM) 60. The MM 60 includes instructions that, when executed by the processor 50, cause data to be sent to the computing systems 18-22 and/or to be received from the computing systems 18-22. The MM 60 causes data to be sent and/or received based on input received from a user of the wearable device 16 through the input devices 46. The MM 60 further includes instructions that, when executed by the processor 50, cause the data received by the computing systems 18-22 to be displayed by the display system 24 or presented via one or more of the output devices 48. In various embodiments, the data is displayed on the display such that the information pertaining to a current maintenance procedure is selectively overlaid in the user's current field of view.

Figure 2:
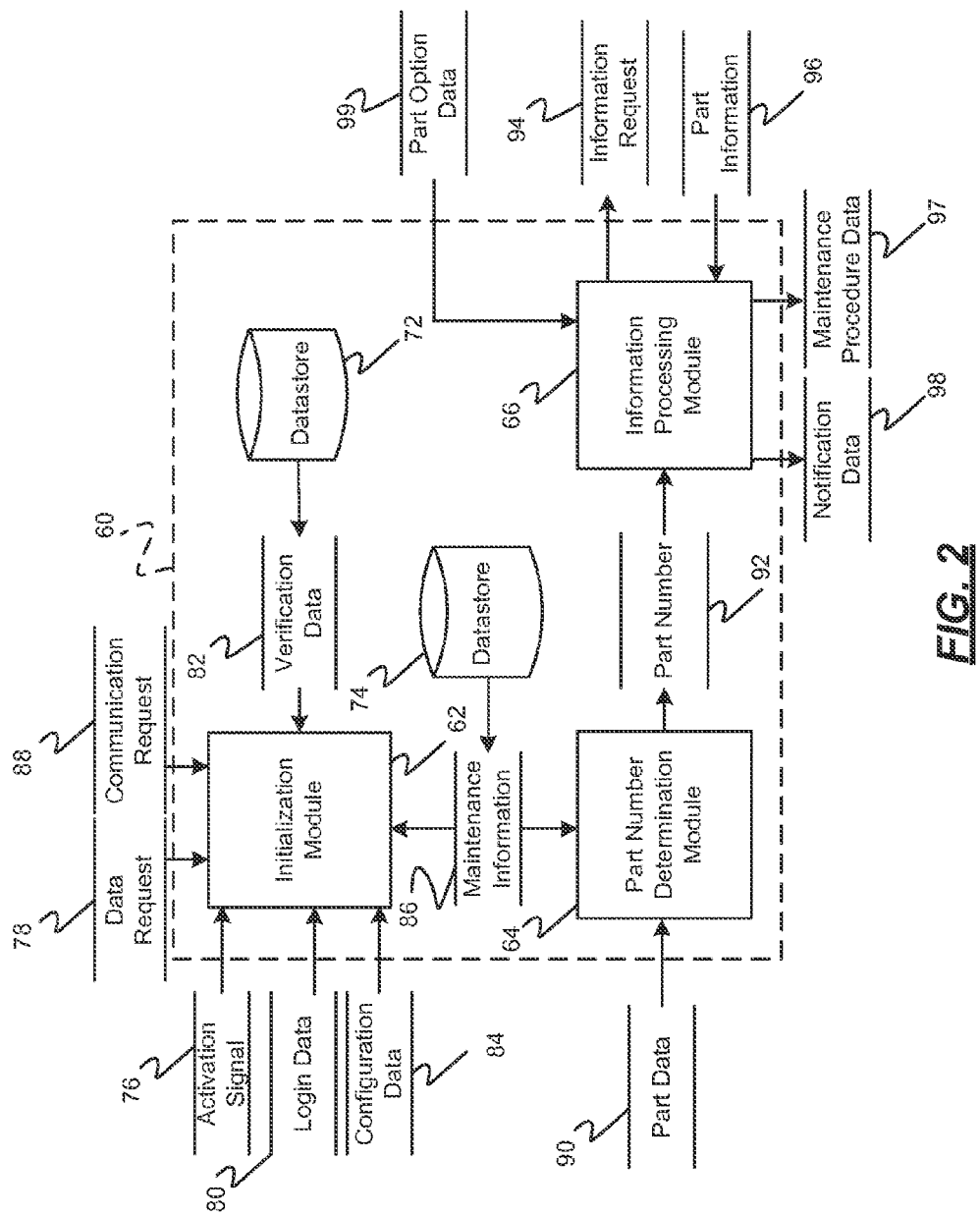
FIG. 2 is dataflow diagram illustrating maintenance management system of a wearable device in accordance with exemplary embodiments.

Referring now to FIG. 2 and with continued reference to FIG. 1, a dataflow diagram illustrates various embodiments of the MM 60 in greater detail. Various embodiments of MM 60 according to the present disclosure may include any number of sub-modules embedded within the MM 60. As can be appreciated, the sub-modules shown in FIG. 2 may be combined and/or further partitioned to similarly aid a user in a maintenance procedure through the wearable device 16. Inputs to the MM 60 may be received from other modules in the computing system 44, from the input devices 46, or from other sub-modules (not shown) within the MM 60. In various embodiments, the MM 60 includes an initialization module 62, a part number determination module 64, an information processing module 6, a data communication module 70, and one or more datastores 72-74.

The initialization module 62 receives as input an activation signal 76. The activation signal 76 indicates and an intent to activate the maintenance terminal which may be initiated by the user or based on a startup of the wearable device 16. Based on the activation signal 76, the initialization module 62 generates a data request 78 for requesting login information through, for example, one or more user interfaces that include objects for entering personal login information and configuration information related to the aircraft 14 and/or maintenance procedure to be performed, or through an audio request that includes a request for personal login information and configuration information related to the aircraft 14 and/or maintenance procedure to be performed.

In response to the request data 78, the initialization module 62 receives as input login data 80. The login data 80 is generated based on a user's interaction with the one or more of the input devices 46. The initialization module 62 verifies the login data 80 based on, for example, verification data 82 stored in a datastore 72. Once the login data 80 is verified, the initialization module 62 receives configuration data 84 indicating information about the particular aircraft and/or maintenance type. Based on the configuration data 84, the initialization module 62 loads aircraft information, maintenance type information, and other information pertinent to a maintenance activity (referred to generally as maintenance information 86) from a datastore 74. The initialization module 62 further establishes communication with the computing systems 18-22 via communication request signals 88.

The part number determination module 64 receives as input part data 90. The part data 90 is generated based on a user's interaction with one or more of the input devices 46. For example, the part data 90 can include speech data that is based on a user's spoken commands and that is generated by the audio recording device. In this example, the part number determination module 64 processes the speech data using one or more speech processing techniques to determine number spoken by the user. In another example, the part data 90 can include video data that is based on a video taken and that is generated by the video recording device. In this example, the part number determination module 64 processes the video data using one more image processing techniques to determine a number displayed on a part or other item in the recorded video.

The part number determination module 64 then confirms the identified number as a number associated with a line replacement unit (LRU) associated with the maintenance activity. For example, the part number determination module 64 confirms the identified number based on the loaded aircraft information, maintenance type information, and other information pertinent to a maintenance activity (referred to as maintenance information 86). Once the number has been confirmed as a part number, the part number determination module 64 provides the part number 92 to the information processing module 66.

The information processing module 66 receives as input the part number 92. The information processing module 66 generates one or more requests 94 for information associated with the part number 92. The information processing module 66 communicates the requests to the computing systems 18-22 through the connection established by the initialization module 62.

In response to the requests 94, the information processing module 68 receives as input part information 96 generated by the computing systems 18-22. The information processing module 66 processes the information 96 and, presents the information 96 in some form through the display system (e.g., by way of recognizable symbols or text), and/or the output devices 48 (e.g., audio signals, bone conduction signals, or haptic signals) via notification data 98. For example, the information processing module 66 generates user interface data that integrates the part information 96 into a user interface that is displayed by the display system. In another example, the information processing module 66 generates audio data that integrates the part information 96 into an audio notification that is played by the audio device, or the bone conduction device.

In various embodiments, the part information 96 includes one or more part options. The part options are presented to the user and the user may select and/or configure a part option via one or more of the input devices 46. For Example, the part option can include an option to order a new part, request a maintenance procedure for a particular part, an option to report the maintenance activity status to one or more of the computing systems, etc. Part option data 99 is received in response to the user's selection and/or configuration of the part option. The information processing module 66 communicates maintenance procedure data 97 including the part option and any other pertinent information to one or more of the computing systems 18-22 via the connection established by the initialization module 62.

Figure 3:
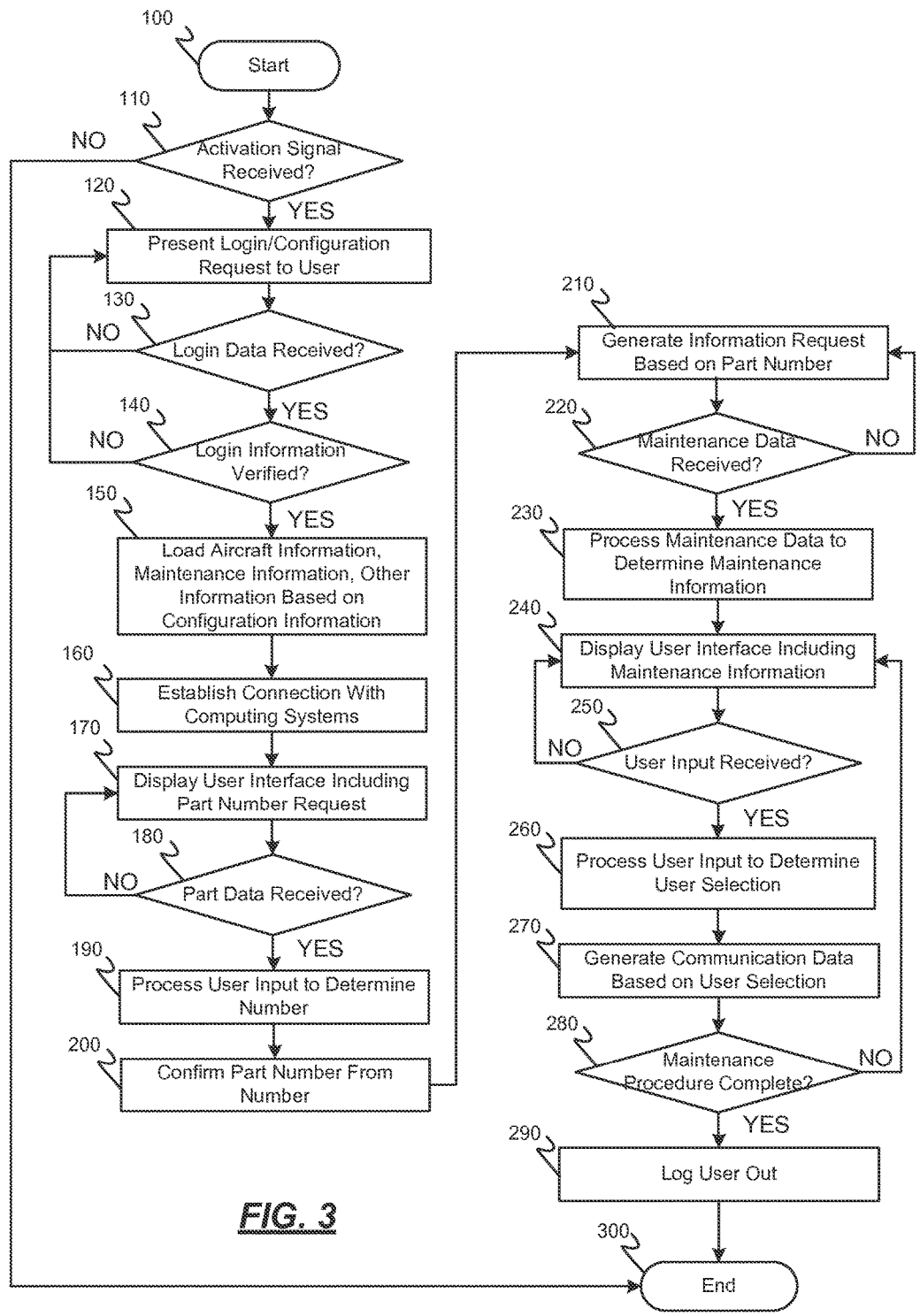
FIG. 3 is a flowchart illustrating a maintenance management method that may be performed by the cab the maintenance management system in accordance with exemplary embodiments.

Referring now to FIG. 3, and with continued reference to FIGS. 1 and 2, a flowchart illustrates a method that can be performed by the MM 60 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. As can further be appreciated, one or more steps may be added or removed from the method shown in FIG. 3, without altering the spirit of the method.

In various embodiments, the method can be scheduled to run based on predetermined events, and/or can run continually during operation of the wearable device 16.

The method may begin at 100. It is determined whether the activation signal 76 is received at 110. If the activation signal 76 is not received at 110, the method may end at 300. If, however, the activation signal 76 is received at 110, the data request 78 including the request for login information is presented to the user at 120. Once login data 80 and configuration data 84 is received at 130, the login information from the login data 80 is processed and verified at 140. If the login information is verified at 140, the configuration data 84 indicating the particular aircraft and/or maintenance type is processed and aircraft information, maintenance type information, and other information pertinent to a maintenance activity (maintenance information 86) is loaded at 150. Connections are established with the computing systems 18-22 via the communication requests 88 at 160.

Thereafter, the request for the part data is generated at 170. Once the part data 90 is received at 180, the part data 90 (e.g., either the voice data or the video data) is processed to determine the captured number at 190. The captured number is confirmed as a part number based on the maintenance information 86 at 200. The request 94 for information is generated based on the part number 92 at 210. Once the part/maintenance information 96 is received at 220, the part/maintenance data 96 is processed to determine the maintenance information at 230; and the maintenance information is presented to the user via the notification data 98 at 240.

It is then determined whether user input is received in response to the notification data at 250. Once user input is received at 250, the user input is processed to determine a user selection at 260. The user selection is either used to determine additional information to be presented to the user or is communicated to the computing systems 18-22 at 270. If the maintenance procedure is not complete at 280, the method continues with presenting the maintenance information to the user at 240. If, however, the maintenance procedure is complete at 280, the user is logged out at 290, and the method may end at 300.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for managing maintenance activities by a maintenance module on an aircraft coupled with a wearable device receiving both audio and video data, comprising:

configuring the maintenance module to receive both the audio and video data from one or more input devices for use with obtaining data of maintenance activities from a plurality of computing systems coupled to the maintenance module, the computing systems comprising: onboard aircraft systems, airline operation systems, and inventory systems wherein the inventory systems store information about aircraft parts and tools used in maintenance activities;

generating, by a part data determination module within the maintenance module, part data from an interaction by use with the one or more input devices wherein the input devices comprise devices capable of receiving a voice interaction by use and a video interaction by use;

processing, by the one or more input devices, the voice and video interaction by the use to identify the part data wherein the voice interaction comprise: voiced data of the part data by use and the video interaction comprise: image data of the part data by use;

receiving, by the part data determination module at the wearable device, voice and image data of the part data from at least the one or more input devices which further comprise: a video recording device and an audio recording device associated with the wearable device wherein the video recording device determines the part data by image processing solutions of at least the image data and the audio recording device determines a part number by speech processing solutions of at least the voice data;

confirming, by the part data determination module, at least a number of a replacement unit from the part data determined by either the image processing or speech processing solutions wherein the confirming is based on at least information which comprise: aircraft information and maintenance information loaded into the maintenance module;

communicating, after the confirming by the part data determination module, by the wearable device via an information processing module coupled to the part data determination module, requests for part information associated with the part data to the computing systems, the information processing module further configured to perform the step of:

receiving part information related to the part data from the computing systems, processing the part information from the computing systems to generate user interface data to integrate, in a first instance the part information into a user interface for display and in a second instance the part information into audio data for audio notifications;

presenting maintenance information, by the information processing module, via the user interface for display by a display system, and audio notifications by an audio system of the wearable device;

configuring, by the information processing module from the maintenance information presented, a part option from a user selection of a set of part options via the one or more input devices, the set of part options comprising: to order a new part, to request a maintenance procedure for a part, and to report a maintenance activity status to one or more of the computing systems; and receiving part option data in response to the user selection of the part option wherein the information processing module communicates maintenance procedure data with the part option data to the computing systems.

2. The method of claim 1, further comprising identifying a part number from the part data, and wherein the communicating is based on the part number.

3. The method of claim 2, wherein the identifying is based on a speech recognition technique.

4. The method of claim 2, wherein the identifying is based on a video processing technique.

5. The method of claim 1, wherein the presenting maintenance information comprises displaying maintenance symbols in a field of view of the user via the display system.

6. The method of claim 1, wherein the presenting maintenance information comprises playing maintenance instructions to the user via the audio system.

7. The method of claim 6, wherein the audio system includes at least one of a bone conduction device of the wearable device and a conventional audio device of the wearable device.

8. The method of claim 1, further comprising establishing a connection between the wearable device and the onboard avionics system, and wherein the communicating is based on the connection.

9. The method of claim 1, further comprising establishing a connection between the wearable device the airline operations system, and wherein the communicating is based on the connection.

10. The method of claim 1, further comprising establishing a connection between the wearable device and the inventory management system, and wherein the communicating is based on the connection.

11. A system for managing maintenance of an aircraft, comprising:

a wearable device comprising a display device, an audio system, and at least one of an audio recording device and a video recording device, wherein the wearable device is configured to:

generate, via a maintenance module, part data from an interaction by use of the wearable device with one or more input devices coupled to the maintenance module wherein the input devices comprise devices capable of receiving inputs of a voice interaction by the use and a video interaction by the use;

process, via the maintenance module, the inputs from the one or more input devices of the voice and video interaction by the use to identify the part data wherein the voice interaction comprise: voiced data of the part data by the use and the video interaction comprise: image data of the part data by the use;

receive, via the maintenance module, voice and image data of the part data from at least the one or more input devices which further comprise: the video recording device and the audio recording device wherein the video recording device determines the part data by image processing solutions of at least the image data and the audio recording device determines a part number by speech processing solutions of at least the voice data;

confirm, via the maintenance module, an option of a set of options of ordering at least a number of a replacement unit from the part data determined by either the image processing or speech processing solutions wherein the confirming is based on at least information which comprise: aircraft information and maintenance information loaded into the maintenance module wherein the set of options further comprises: to request a maintenance procedure for a part, and to report a maintenance activity status; and communicate with at least one of an onboard avionics system, an airline operations system, and an inventory management system based on the part data, and present maintenance information to a user via at least one of the display system and a bone conduction device of the wearable device.

12. The system of claim 11, wearable device is configured to identify part number from the part data, and wherein communicate based on the part number.

13. The system of claim 12, wherein the wearable device is configured to identify the part number based on a speech recognition technique.

14. The system of claim 12, wherein the wearable device is configured to identify the part number based on a video processing technique.

15. The system of claim 11, wherein the wearable device is configured to present maintenance information by displaying maintenance symbols in a field of view of the user via the display system.

16. The system of claim 11, wherein the wearable device is configured to present maintenance information by playing maintenance instructions to the user via the audio system.

17. The system of claim 11, wherein the audio system is a bone conduction system.

18. The system of claim 11, wherein the wearable device is configured to establish a connection between the wearable device and the onboard avionics system, and communicate based on the connection.

19. The system of claim 11, wherein the wearable device is configured to establish a connection between the wearable device the airline operations system, and communicate based on the connection.

20. The system of claim 11, wherein the wearable device is configured to establish a connection between the wearable device and the inventory management system, and communicate based on the connection.

21. A system for managing maintenance of an aircraft, comprising:
a wearable device to communicate with one or more computing systems via input/output interfaces wherein the wearable device comprises: a maintenance module, an audio device, a display device, and at least one of an audio recording device and a video recording device wherein the display device is configurable such that information pertaining to a maintenance activity is displayed in a field of view of an user irrespective of a viewing direction of the user wherein the computing systems comprise: an onboard system that stores information about the aircraft, an airline operations system that stores departure and arrival information at least about the aircraft and an inventory management system that stores information about aircraft parts and tools used in maintenance activities, the maintenance module further comprising:
an initialization module for receiving login data generated based on interaction of the user with the audio recording device or the video recording device, the initialization module verifies the login data based on verification data in a datastore coupled to the initialization module whereupon once verified, configuration data about a particular aircraft and maintenance type is sent to the initialization module;
a part number determination module coupled to the initialization system for receiving part data wherein the part data is generated based on interaction of the user with the video recording device or the audio recording device wherein the part data comprises: speech data of spoken commands of the user generated by the audio recording device wherein the speech data is processed using one or more speech processing techniques to determine a part number from the spoken commands of the user, and video data based on recorded video generated by the video recording device wherein the video data is processed using one more image processing techniques to determine a part number from a part number displayed in the recorded video, the part determination module performing a further step of confirming the part number based on aircraft information and maintenance type information;
an information processing module for receiving the part number to generate one or more requests for information associated with the part number by communicating the requests to the computing systems through a connection established via the initialization module, and in response to one or more requests, the information processing module receives part information generated by the computing systems for presenting by the display or audio device, the part information comprising: a part option for selecting via the display or audio device an option to order a new part, to request of a maintenance procedure for a particular part, and to report the maintenance activity status to the computing systems, the information processing module communicates maintenance procedure data comprising: the part option to the computing systems via the connection established by the initialization module.

* * * * *